US006408026B1

(12) United States Patent
Tao

(10) Patent No.: US 6,408,026 B1
(45) Date of Patent: Jun. 18, 2002

(54) DEADZONE QUANTIZATION METHOD AND APPARATUS FOR IMAGE COMPRESSION

(75) Inventor: Bo Tao, Sunnyvale, CA (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/370,065

(22) Filed: Aug. 6, 1999

(51) Int. Cl.⁷ .............................................. H04B 1/66
(52) U.S. Cl. ................... 375/240.03; 382/251
(58) Field of Search ................ 375/240.03, 240.02, 375/240.22, 240.11, 240.01, 240.19; 382/251, 252, 253, 242, 275; 348/404.1, 407.1, 420.1, 431.1, 388.1; 341/51

(56) References Cited

U.S. PATENT DOCUMENTS

| | | | | |
|---|---|---|---|---|
| 5,412,429 A | * | 5/1995 | Glover | 348/388.1 |
| 5,815,097 A | * | 9/1998 | Schwartz et al. | 341/51 |
| 5,850,482 A | * | 12/1998 | Meany et al. | 382/232 |
| 6,091,777 A | * | 7/2000 | Guetz et al. | 375/240.03 |

FOREIGN PATENT DOCUMENTS

EP          0 555 016         8/1993  ............ H04H/7/13

OTHER PUBLICATIONS

Calvagno, G. et al: "Buffer Control Technique for Video Coding" Advanced Image and Video Communications and Storage Technologies, US, Bellingham, SPIE, vol. 2451, 1995, pp. 31–40, XP000732644, ISBN: 0–8194–1802–1.

Hang, Hsueh–Ming et al.: "Source Model for Transform Video Coder and Its Application—Part I: Fundamental Theory" IEEE Transactions on Circuits and Systems for Video Technology, US, IEEE Inc. New York, vol. 7, No. 2, Apr. 1, 1997, pp. 287–298, XP000687648, ISSN: 1051–8215.

Müller, F., "DistributionShape of Two–Dimensional DCT Coeffiecients of Natural Images", Electronics Letters, Oct. 28 1993, vol. 29, No. 22 (pp. 1935–1936).

LoPresto, Scott M., et al., "Wavelet Image Coding Using Rate–Distortion Optimized Backward Adaptive Classification", SPIE, vol. 3024, 1997 (pp. 1026–1037).

Mallat, Stéphane et al., "Understanding Image Transform Codes", Proceedings of the SPIE Aerospace Conference, Orlando, Apr. 1997 (pp. 1–43).

Chou, Philip A., et al., "Entropy–Constrained Vector Quantization", IEEE Transactions on Acoustics, Speech, and Signal Processing, vol. 37, No. 1, Jan. 1989 (pp. 31–42).

Karamata, Jovan, "Sur une inégalité relative aux fonctions convexes", Publ. Math Univ. Belgrade 1 (pp. 145–148).

* cited by examiner

*Primary Examiner*—Chris Kelley
*Assistant Examiner*—Gims Philippe
(74) *Attorney, Agent, or Firm*—Skjerven Morrill MacPherson LLP; David W. Heid

(57) ABSTRACT

A method for efficiently optimizing the bin widths for a distribution or an image to be compressed. An image having symmetric uni-modal distribution is divided into a zero bin having a zero bin width and a plurality of outer bins having an outer bin width. M numbers of predetermined candidate values for the zero bin width and N numbers of predetermined candidate values for the outer bin width are provided. A zero bin probability is derived from an entropy function. The allowable zero bin width is calculated from the zero bin probability and target bit rate. The allowable zero bin width is then searched to obtain an optimum combination of the zero bin width and the outer bin width, the optimum combination being the combination having the least distortion measure. In one embodiment, a fast algorithm is used to search the outer bin width for each given zero bin width, reducing the required combination by a factor of logN/N. In one embodiment, the allowable zero bin width is a subset of M number of candidate values for the zero bin width. In one embodiment, the middle number of an interval is used as the quantization value. In another embodiment, the centroid of an interval is used as the quantization value.

17 Claims, 4 Drawing Sheets

DEADZONE QUANTIZATION METHOD AND APPARATUS FOR IMAGE COMPRESSION

FIELD OF THE INVENTION

This invention relates to image and video data compression and more particularly to a deadzone quantizer.

BACKGROUND OF THE INVENTION

Image data for digital video and still images are often compressed to represent images with less data, thus save storage costs and transmission time and cost. In general, the goal in image data compression is to decrease the data required to represent an image. However, the reduction in data representing an image must be accomplished without substantial penalty in picture quality.

The most effective compression is achieved by approximating the original image, rather than reproducing it exactly. In the motion picture arena, two standards (referred hereinbelow as "MPEG-1" and "MPEG-2") have been developed by the Motion Picture Experts Group (MPEG) to specify both the coded digital representation of video signal for the storage media, and the method for decoding. In the still image arena, the Joint Photographic Experts Group (JPEG) has set the international standard (referred hereinbelow as "JPEG" and "JPEG 2000") for color image compression. For MPEG-1, MPEG-2, as well as JPEG and forthcoming JPEG 2000, the greater the compression, the more approximate ("lossy") the rendition is likely to be.

The above-mentioned compression standards use the image transform. The most common transform is the discrete cosine transform (DCT) which is used in MPEG-1, MPEG-2 and JPEG. Another transform type is wavelet transform which will be adopted by the JPEG 2000 standard. The DCT has certain properties that simplify coding models and make the coding efficient in terms of perceptual quality measures. In general, the DCT is a method of decomposing a block of data into a weighted sum of spatial frequencies. Each of the spatial frequency patterns for a DCT, e.g., an 8×8 DCT, has a corresponding coefficient, in which the amplitude needed to represent the contribution of that spatial frequency pattern in the block of data being analyzed. In other words, each spatial frequency pattern is multiplied by its coefficient and the resulting 64 8×8 amplitude arrays are summed, each pel separately, to reconstruct the 8×8 block. Note that the 8×8 DCT consists an 8 by 8 array of pels. Pel is a contraction for picture or print element used in the displaying/printing industry.

At the heart of the compression is a quantizer. When the DCT is computed for a block of pels, it is desirable to represent the coefficients for high spatial frequencies with less precision. Quantization allows the reduction of accuracy with which the DCT coefficients are represented when converting the DCT coefficient to an integer representation. Quantization is very important in image compression, as it tends to make many coefficients zero, especially those for high spatial frequencies, and thus saves storage space and/or transmission bandwidth.

Conventionally, a DCT coefficient is quantized by dividing it by a nonzero positive number called a quantization step size and rounding the quotient to the nearest integer called a quantization index. By multiplying this integer quantization index with the quantization step size, an approximation of the true DCT coefficient is obtained. This approximation is called the quantized transform coefficient, quantized DCT coefficient, quantization value or reconstruction value. The bigger the quantization step size is, the lower the quantized DCT coefficient precision. The lower precision coefficients can be transmitted to a decoder with fewer bits than higher precision coefficients. The use of large quantization step sizes for high spatial frequencies allows the encoder to selectively discard high spatial frequency activity that the human eye cannot readily perceive.

FIGS. 1A–1D (prior art) illustrate quantization and dequantization. FIG. 1A shows unquantized DCT coefficients 100 at an interval of one. It is to be noted that the unquantized DCT coefficient is a real number and can be either an integer or a non-integer. FIG. 1B shows quantization intervals 102 at an interval of Δ. For example, the interval Δ chosen is 4. Each interval 102 is called a "bin". The center interval surrounding the value zero "0", e.g., values −2 and 2, is called the "zero bin". FIG. 1C shows quantized DCT coefficient index 104 after quantization at quantization intervals 102. Conventionally, the quantized DCT coefficient indices are always integers. In addition, all bins have the same size, except the outer-most bins from a predetermined cutoff value to infinity. FIG. 1D shows dequantized DCT coefficient 106 after quantized DCT coefficient is dequantized using quantization intervals 102.

The quantizer above is known as a uniform quantizer since all bins have the same size. However, because in transform-based image and video coding, the AC coefficients typically have a sharp concentration around zero in their distribution, a different bin size for the zero bin is needed to improve the rate-distortion performance. A quantizer having a different zero bin width than the bin width for all other bins is known as a deadzone quantizer. A deadzone quantizer therefore is characterized by two parameters, the zero bin width and the outer bin width. In many applications, such as coders based on ISO JPEG, ISO MPEG-2 and ITU-T H.263, the bin widths are chosen so that the zero bin width is twice the outer bin width, i.e. zero bin width/outer bin width=2. Although this ratio has been empirically verified to give reasonably good performance across a variety of distributions and images, it is often not the optimal ratio for a particular distribution or image.

S. Mallat and F. Falzon, in a paper entitled "Understanding image transform codes," Proc. SPIE Aerospace Conference, April 1997, disclose a fixed ratio of 1.62 for zero bin width over outer bin width. This ratio is obtained for a large class of distributions, and thus is not optimal for a particular distribution or image that an encoder is currently encoding.

It has seldom been studied what is the optimal choice of the zero bin width and the outer bin width for different distributions and/or different images, and furthermore, how this optimal parameter set can be efficiently computed. LoPresto et al. have studied optimal parameter set in a paper entitled "Wavelet Image Coding Using Rate-Distortion Optimized Backward Adaptive Classification" (Proc. SPIE Visual Communications and Image Processing, Vol. 3024, p.1026, 1997). In this paper, the wavelet coefficient distribution is approximated with a generalized Gaussian distribution. For each of several types of generalized Gaussian distributions, 500 deadzone quantizers are tabled. For a given coefficient, its distribution is fitted with one of the several pre-selected generalized Gaussian distributions. The 500 deadzone quantizers for the selected generalized Gaussian distribution are then compared by using the Lagrange multiplier method to choose one of the 500 deadzone quantizers. This method requires a multiple of 500 comparisons before the final selection is made. Thus, this method is computationally expensive. More importantly, since only several typical generalized Gaussian distributions are used to fit the actual distribution, the resulting deadzone quantizer is not an optimal one. Therefore, although this technique tunes more specifically to a particular distribution or image than the previous methods of using fixed ratios, e.g., 2 or 1.62, this technique does not solve the general problem of finding the optimal solution for a particular distribution or image.

Without an analytical framework, that is, without the understanding of the relationships among the number of bits required to approximate an image (bit rate), the approximation accuracy (distortion) and the two parameters of a deadzone quantizer, an optimal deadzone quantizer may be found with an exhaustive (brute-force) numerical search which is the only known method to date. For example, if only the distribution is known, various zero bin widths and outer bin widths are plugged into an equation and the results calculated. The zero bin width and outer bin width combination that gives the best result is then selected. If the actual image to be compressed is available, all the calculated results from various zero bin width and outer bin width combinations are tested by actually quantizing the transform coefficients directly. The best zero bin width and outer bin width combination is then obtained by examining the test results.

The number of combinations to be calculated or tested depends on two numbers M and N. More specifically, a zero bin width set containing M candidate values for the zero bin width and an outer bin width set containing N candidate values for the outer bin width are used to find the optimal combination of zero bin width and outer bin width. Hence, the number of possible combinations is MN. In general, numbers M and N are predetermined based on the tradeoffs of accuracy versus cost. For example, the larger the numbers M and N are, the more computations are required for the numerical search, hence, more costly. On the other hand, the lager the numbers M and N are, the more accurate the result because smaller intervals or a greater number of possible candidates may be used. Typical values for M and N are greater than or equal to 1000. It is to be noted that the actual zero bin width is twice the candidate values for the zero bin width in this disclosure.

During the numerical search, for each combination of zero bin width and outer bin width, the associated distortion and entropy are computed. The combination that gives the minimum distortion measure and satisfies the target bit rate, i.e., the amount of storage space or transmission bandwidth available, is then selected as the optimal bin widths. The Lagrange multiplier method, often used to solve the entropy-constrained quantizer design problem and described in the LoPresto article, requires the same MN number of combinations to be computed in searching the optimal combination because each fixed Lagrange multiplier is effectively equivalent to the combinatorial method above.

Due to the complexity and the cost associated with such computational-intensive method, instead of executing MN possible combinations and calculating their errors, entropies, and bin widths, a fixed ratio, e.g., 1.62 or 2.0, is usually used to reduce the number of computations because only one of zero bin width or outer bin width needs to be searched but not both. However, as discussed above, a fixed ratio often does not give the optimum result because it does not apply to the particular distribution and/or the particular image in question.

In general, the bin widths chosen depend on the entropy (i.e. bit rate) required, the entropy being the theoretical average of the bits used to encode the image of a video frame. An entropy constrained quantizer limits the number of bits that can be used to represent particular data but still achieve a high quality image. The constraint is usually determined by the allowable storage space or transmission bandwidth for a particular application.

After the bin widths are selected from the above numerical search method, a quantization value is chosen to compress the data. The quantization value is the number between two boundary numbers where all the numbers that fall within the bin between the boundary values are discretized to. In a practical approach, the middle number between the boundary numbers is selected. For example, the quantization value for numbers that fall within a bin between values 5 and 6 are quantized to $5+(6-5)/2=5.5$. In a centroid approach, the quantization value is computed as:

$$C = \frac{\int_i^j xp(x)dx}{\int_i^j p(x)dx} \quad (1)$$

where C is the quantization value; i and j are the boundary numbers of the interval to be quantized; and p is the probability of occurrence of each number x. Conventionally, either the practical approach or the centroid approach is used.

Therefore, what is needed is an efficient method in optimizing the bin widths for a distribution or an image to be compressed, the method capable of adapting to any given quantization value selection approach.

SUMMARY OF THE INVENTION

In accordance with the present invention, a method for efficiently optimizing the bin widths for a distribution or an image to be compressed is provided. An image having symmetric uni-modal distribution is divided into a zero bin having a zero bin width and a plurality of outer bins having an outer bin width. M numbers of predetermined candidate values for the zero bin width and N numbers of predetermined candidate values for the outer bin width are provided. A zero bin probability is derived from an entropy function for a target entropy value, i.e. bit rate. The allowable zero bin width is then calculated from the zero bin probability. The allowable zero bin width is then searched to obtain an optimum combination of the zero bin width and the outer bin width, the optimum combination being the combination resulting in the least distortion measure while satisfying the target bit rate.

In one embodiment, the image is a still image. In another embodiment, the image is a video image. In one embodiment, a look up table is generated for the entropy function and the zero probability. The look up table is loaded into a random access memory (RAM) during the search for the optimum combination of the zero bin width and the outer bin width for a given target entropy value. The distortion measure is calculated for each allowable zero bin width and each of the candidate values of outer bin width. The combination that results in the least distortion measure while satisfying the target bit rate is selected as the optimum combination. In one embodiment, a fast algorithm is used to search the outer bin width for a given zero bin width, reducing the required combination by a factor of logN/N. In one embodiment, the set of allowable zero bin width is a subset of M number of candidate values for the zero bin width, thus further reducing computation cost.

A quantization value is then chosen to encode the image. In one embodiment, the middle number of an interval is used as the quantization value. In another embodiment, the centroid of an interval is used as the quantization value.

DETAILED DESCRIPTION

The following description is meant to be illustrative only and not limiting. Other embodiments of this invention will be obvious in view of the following description to those skilled in the quantizer arts.

Preliminarily it is to be noted that the terms "distortion," "error," and "approximation error" will be used interchangeably to denote the error in approximating an image by quantizing the transform coefficients. Further, the terms "entropy," "rate," "bit-rate," and "number of bits" are used interchangeably to denote the number of bits used to represent the quantized transform coefficient, or the approximated image.

Figure 1A:
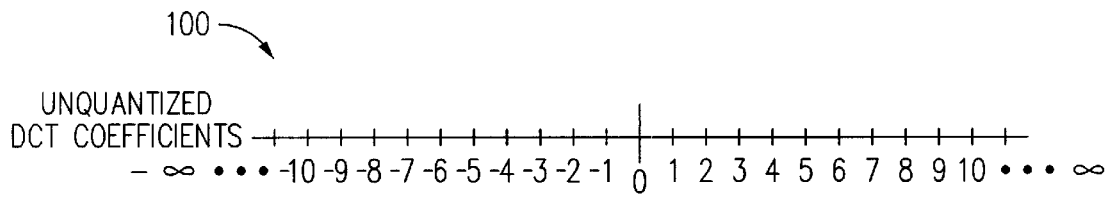
FIGS. 1A through 1D (prior art) illustrate quantization and dequantization.
Figure 1B:
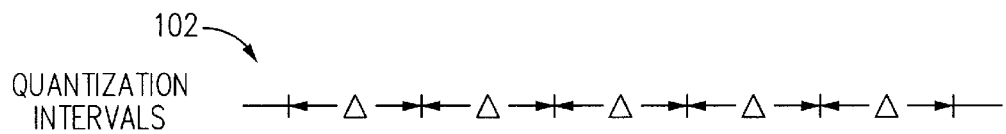
Figure 1C:
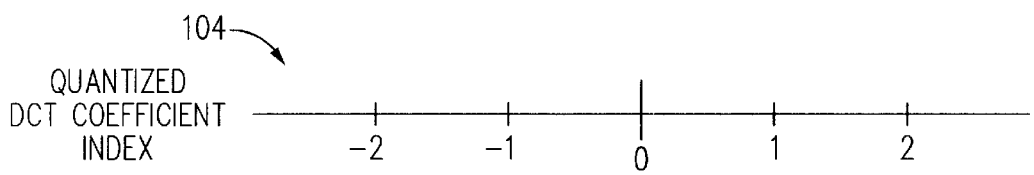
Figure 1D:
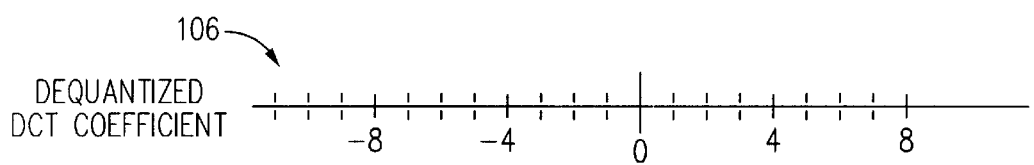
Figure 2:
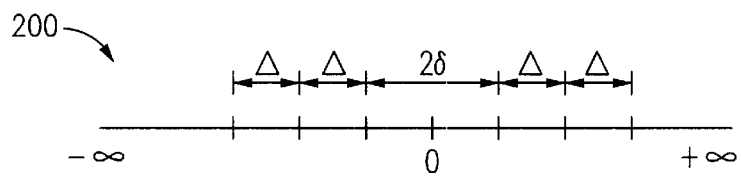
FIG. 2 illustrates detailed discrete cosine transform (DCT) coefficient.

FIG. 2 illustrates DCT coefficients 200. In accordance with the present invention, zero bin width is defined as $2\delta$ and the outer bin width for the outer bins is defined as $\Delta$. In accordance with the invention, the optimum bin widths for zero bin width $2\delta$ and outer bin width $\Delta$ are found through an efficient numerical search in which the computations required to accomplish the numerical search is decreased. The efficient numerical search is applicable for symmetric uni-modal distributions which are representative of transform coefficients of most still images and video images.

Figure 3A:
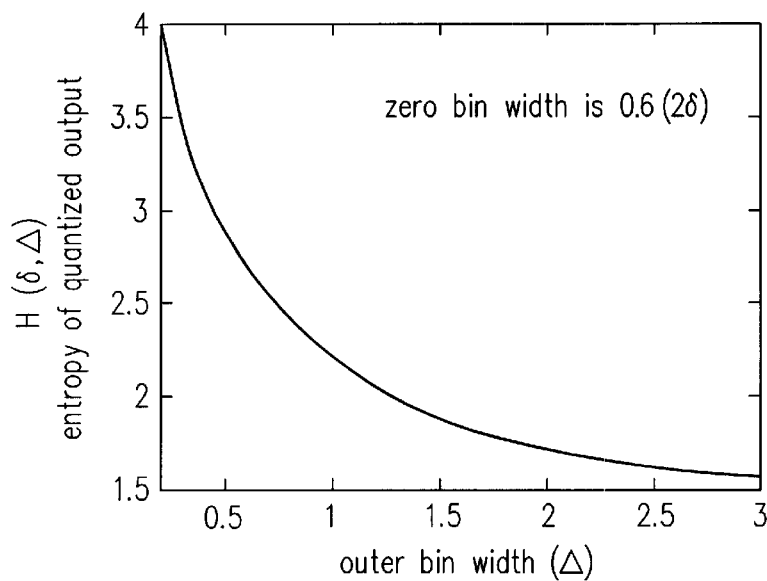
FIG. 3A shows entropy measurements as a function of the outer bin width, with a fixed zero bin width.
Figure 3B:
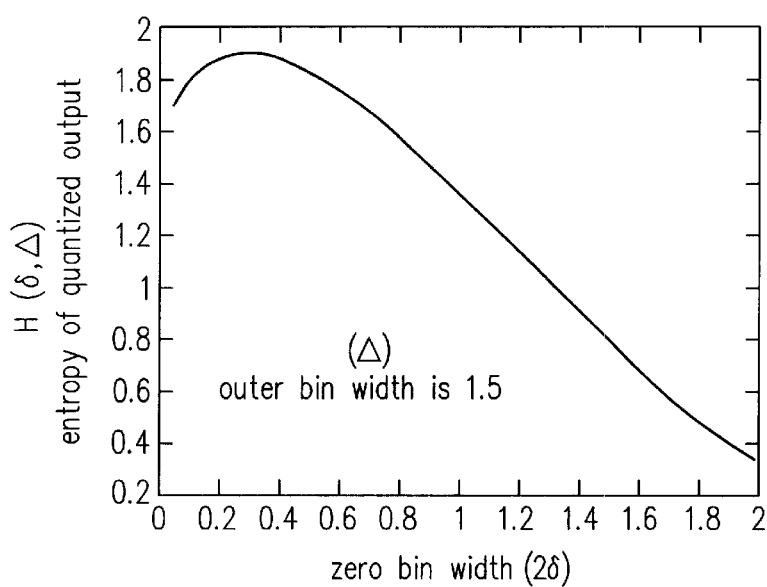
FIG. 3B shows entropy measurements as a function of the zero bin width, with a fixed outer bin width.

Reducing the number of computations for symmetric uni-modal distributions is possible because the entropy $H(\delta,\Delta)$ of the deadzone-quantized output monotonically decreases when the outer bin width $\Delta$ of the deadzone quantizer increases with a fixed zero bin width $2\delta$, as shown in FIG. 3A. FIG. 3A shows entropy measurements as a function of outer bin width $\Delta$ with a fixed zero bin width $2\delta$ of 0.6. The input distribution is zero-mean Gaussian with the variance being a value "one", i.e., $$p(x) = \frac{1}{\sqrt{2\pi}} \exp\left(\frac{-x^2}{2}\right) \quad (2)$$

where p(x) is the distribution of the transform coefficients as used in equation (1). This monotonic decreasing relationship is discussed in detail below. It is to be noted that the monotonically decreasing relationship does not hold for a fixed outer bin width A, as shown in FIG. 3B. FIG. 3B shows entropy measurements as a function of zero bin width $2\delta$, with a fixed outer bin width $\Delta$ off 1.5. As can be seen, entropy $H(\delta,\Delta)$ does not vary monotonically with the zero bin width $2\delta$.

Figure 4:
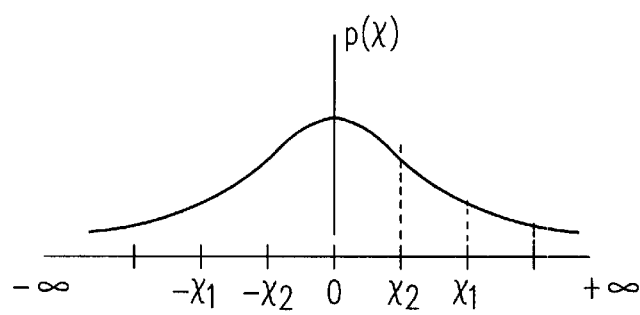
FIG. 4 shows a uni-modal probability distribution of the variables to be quantized.

Assume that the probability distribution p(x) of the variables x (i.e., transform coefficients) to be quantized is symmetric around zero and uni-modal, as shown in FIG. 4. Then, the following are true.

$$p(x)=p(-x) \quad (3)$$

and $$p(x_1) \leq p(x_2), \text{ if } x_1 \geq x_2 \geq 0. \quad (4)$$

Equations (3) and (4) are shown to be well suited in representing image transform coefficients in a publication by F. Müller, entitled "Distribution of two-dimensional DCT coefficients of natural images," Electronics Letters, vol. 29, no. 22, p1935–1936, 1993, hereby incorporated by reference in its entirety.

Figure 5A:
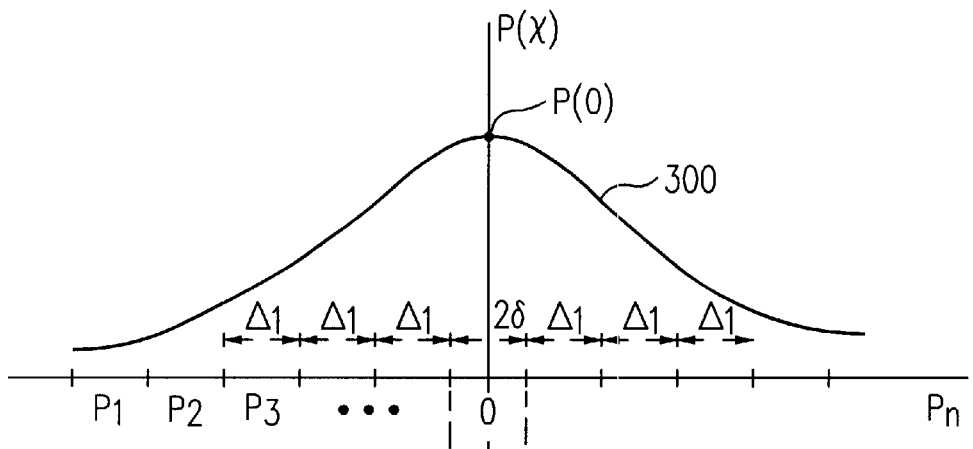
FIGS. 5A and 5B show mass probability functions computed from a generalized Gaussian distribution.

Referring to FIG. 5A, curve 300 represents mass probability function P(x) computed from a generalized Gaussian distribution that is frequently used to model the AC coefficients in transform coding. The number n is the number of bins. The mass probability function $P_i(x)$ is the probability of a number x occurring in the ith bin. The associated deadzone quantizer has a zero bin size $2\delta$ and outer bin size $\Delta_1$.

Generalized Gaussian distributions are used because these distributions cover a wide range of symmetrical distributions including Laplacian and Gaussian. Detailed explanation of the distribution shape of two-dimensional DCT coefficients of natural images can be found in the publication by F. Müller entitled "Distribution Shape of Two-Dimensional DCT Coefficients of Natural Images," Electronics letters, vol. 29, no. 22, p.1935–1936, 1993, incorporated by reference in its entirety above.

Figure 5B:
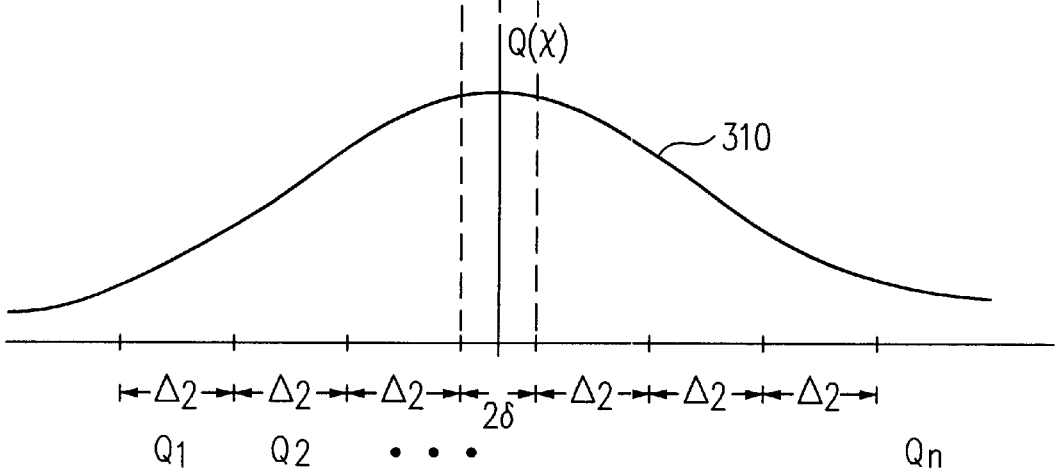

Similarly, curve 310 in FIG. 5B represents probability function Q(x) computed from the same generalized Gaussian distribution that used to calculate p(x). The associated deadzone quantizer has the same number of bins n, and has a zero bin size $2\delta$ and outer bin size $\Delta_2$.

The mass probability distributions P and Q above are re-ordered such that $P_1 \geq P_2 \geq \ldots \geq P_n$ and $Q_1 \geq Q_2 \geq \ldots \geq Q_n$. P is said to be more uniform than Q if, $$\sum_{i}^{k} P_i \leq \sum_{i}^{k} Q_i, \forall \ 1 \leq k \leq i \quad (5)$$

Then, $$H(P) \geq H(Q) \quad (6)$$

where H is the entropy function, i.e., the theoretical average number of bits used to represent the quantized transform coefficient. This result is a corollary of the theorem given by J. Karamata entitled "Sur une inégalitè relative aux fonctions convexes," Publ. Math. Univ. Belgrade, vol. 1, p145–148, 1932, hereby incorporated by reference in its entirety. The English translation for the title is "On Relative Inequality of Convex Functions." The paper proves an equality for convex functions.

A corollary (7) is then derived from equation (6):

$$H(\delta, \Delta_1) \geq H(\delta, \Delta_2) \text{ if } \Delta_1 \geq \Delta_2. \quad (7)$$

This corollary is applicable to symmetric uni-modal distributions which are typical for transform coefficients of images.

For a deadzone quantizer having 2L+1 bins with zero bin width 2δ and outer bin width Δ, the quantization rule is given by:

$$Q(x) = \begin{cases} y_{-\infty}, & x < -\delta - (L-1)\Delta \\ y_{-k}, & -\delta - k\Delta \leq -\delta - (k-1)\Delta \\ y_0, & |x| \leq \delta \\ y_k, & \delta + (k-1)\Delta < x < \delta + k\Delta \\ y_{\infty}, & x > \delta + (L-1)\Delta \end{cases} \quad (8)$$

where $1 \leq k < L$, and $y_i$ are the reconstruction values, i.e. the quantization values.

As discussed above, the quantization values $y_i$ can be chosen to be either the middle of an interval (i.e., bin) or the centroid of the interval. Advantageously, the method of selecting optimum bin width combination in accordance with the present invention applies to both the practical and the centroid approaches in quantization value selection since the bin width selection is decoupled from the actual quantization value selection.

To optimize an entropy-constrained deadzone quantizer, errors must be minimized:

$$\min_{\delta,\Delta} D(\delta, \Delta), \; s.\; t.\; H(\delta, \Delta) \leq h* \quad (9)$$

where $D(\delta,\Delta)$ is the distortion measure, $H(\delta,\Delta)$ is the entropy measure, and $h^*$ is the target bit rate, i.e., the target entropy. The term "s.t." stands for "such that."

Figure 6:
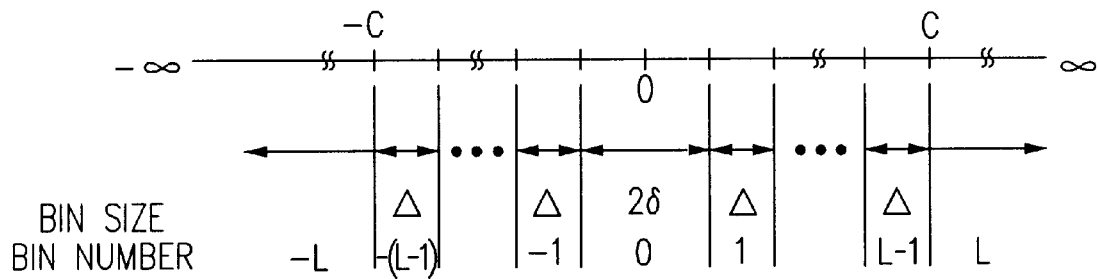
FIG. 6 shows how the various bins are numbered.

FIG. 6 shows how each bin is numbered. Zero bin is the bin surrounding value 0 and has a width of 2δ. The bins to the right of the zero bin are numbered consecutively with a positive number, i.e., 1, 2, ... L−1, and L. Outer bins 1 to L−1 have a width Δ. The outer-most bin L includes values between a cutoff value C and infinity. The bins to the left of the zero bin are mirror images of the bins to the right of the zero bin. For example, the bins to the left of the zero bin are numbered consecutively with a negative number, i.e., −1, −2, ... −(L−1), and −L. Outer bins −1 to −(L−1) have a width Δ. The outer-most bin −L includes values between a cutoff value −C and minus infinity.

With respect to the deadzone quantizer shown in FIG. 6, entropy measure $H(\delta,\Delta)$ is defined by:

$$H(\delta, \Delta) = -P_0 \log P_0 - 2\sum_{l}^{L} P_k \log P_k \quad (10)$$

where $P_0$ is the mass probability for zero bin size;

$$P_0 = \int_{-\delta}^{\delta} P(x)dx \quad (11)$$

$P_k$ is the mass probability of the kth outer bin;

$$P_k = \int_{\delta+(k-1)\Delta}^{\delta+k\Delta} P(x)dx, \; 1 \leq k < L \quad (12)$$

and $P_L$ is the mass probability of the outer-most bin.

$$P_L = \int_{\delta+(L-1)\Delta}^{\infty} P(x)dx \quad (13)$$

A relationship is observed from equations (10)–(13):

$$H(\delta,\Delta) \geq h(P_0) + 1 - P_0, \; \forall \Delta > 0 \quad (14)$$

where $$h(P_0) = -P_0 \log P_0 - (1-P_0)\log(1-P_0) \quad (15)$$

The equation $h(P_0)+1-P_0$ is the entropy function for L=1, i.e., one zero bin and two outer bins.

Figure 7:
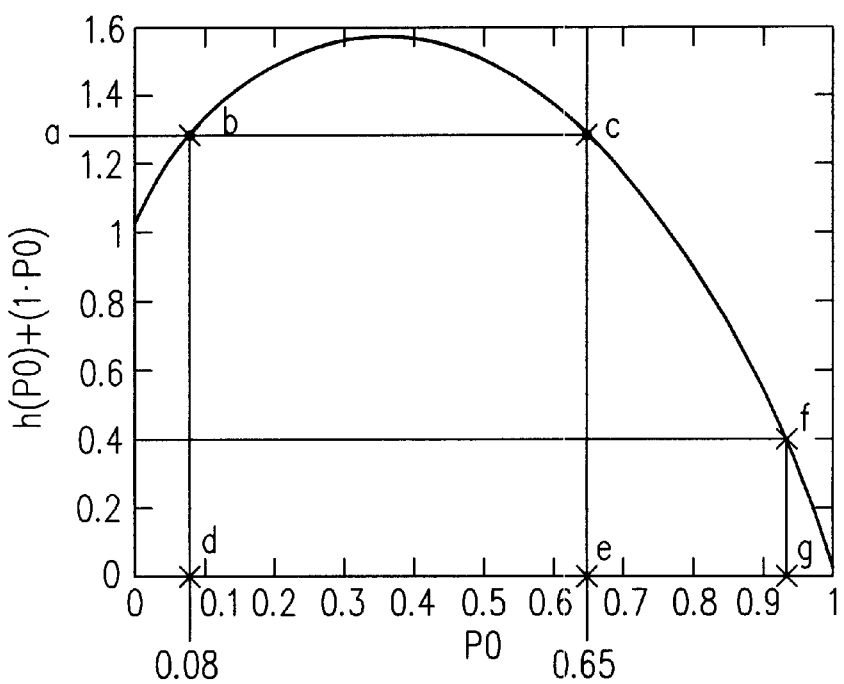
FIG. 7 shows an entropy function plotted as a function of zero probability.

FIG. 7 shows the entropy function $h(P_0)+1-P_0$ plotted as a function of $P_0$. Probability $P_0$ for zero bin width in turn is a function of zero bin width δ as shown in equation (11). Since $P_0$ is a monotonic function of δ, the set of allowable zero bin width δ can be selected as described below.

The optimal deadzone quantizer can be searched efficiently by first searching the allowable zero bin width region, thereby reducing the number M of candidate values for the zero bin width. When the bit rate is very high such that $$h* > \max_{P_0} h(P_0) + 1 - P_0$$

the allowable region is from 0 to ∞. Therefore, all the candidate values for the zero bin width must be searched and no reduction in number M may be had.

However, for high bit-rate coding with $h^* > 1$ and $$h* \leq \max_{P_0} h(P_0) + 1 - P_0,$$

the allowable region is the union of two regions $(\delta \leq \delta_1^*) \cup (\delta \geq \delta_2^*)$ where $h(P_0(\delta_1^*))+1-P_0(\delta_1^*)=h(P_0(\delta_2^*))+1-P_0(\delta_2^*)=h^*$. Thus, the allowable region of zero bin width δ is only a subset of (0,∞). More specifically, referring to FIG. 7, point a is less than the maximum point in the curve and intersects the curve at two points b and c. From the two points, two values d and e for probability measurement $P_0$ can be found. From values d and e, zero bin widths $\delta_1^*$ and $\delta_2^*$ can be derived because zero probability function $P_0$ is a function of δ. Then only the candidate values for the zero bin widths that are smaller than zero bin width $\delta_1^*$ or greater than zero bin width $\delta_2^*$ need to be searched for the optimum zero bin width. Hence, M number of the candidate values can be reduced while keeping the same search accuracy, or the accuracy can be increased without costing extra computation.

Similarly, for low bit-rate coding where the target bit rate $h^*$ is less than or equals to one, i.e., $h^* < 1$, the allowable region for the zero bin width is $\delta \geq \delta^*$, where $h(P_0(\delta^*))+1-P_0(\delta^*)=h^*$. Again, the allowable region of zero bin width δ is a subset of (0,∞). In addition, at low bit rate, the number M can be reduced even further. Referring to FIG. 7, at low bit rate, the value of $h(P_0)+1-P_0$ intersects the curve at only one point. For example, $h(P_0)+1-P_0$ has a value of 0.4 which intersects the curve at point f. Zero probability $P_0$ can be found at, i.e., value g. Zero bin width can then be calculated. Since only one zero bin width is involved, only the candidate values greater than this particular zero bin width need to be computed to find the optimum bin widths.

In one embodiment, for an encoder having a software containing a lookup table that is computed as a function of $h(P_0)=-P_0 \log P_0-(1-P_0)\log(1-P_0)$ where $$P_0 = \int_{-\delta}^{\delta} P(x)dx,$$

for each known bit rate $h(P_0)+1-P_0$, the lookup table can be used to search the associated value $P_0$.

In one embodiment, for each given zero bin width δ, bi-section or other fast search algorithms can be used to find the optimal outer bin width $\Delta^*(\delta)$ such that $H(\delta,\Delta^*(\delta)) \leq h^*$. The fast search algorithm effectively reduces the computational cost from N to logN where N is the total number of candidate values for Δ at each step. For example, if M=1024 and N=1024, instead of 1024×1024 or 1,048,576 computations, only $1024*\log_2(1024)$ or 3,072 computations need to be calculated, thereby further reducing the computational complexity for such a search.

As can be seen from the above description, how the numbers M and N are reduced are independent of each other. Furthermore, using the above method, the optimum deadzone quantizer is selected for each particular image, producing better performance than using a fixed ratio approach.

A practical application implementing the present invention is now described. A computer/encoder computes the transform coefficients, either DCT or wavelet transform, of a received still image or video frame. The computer/encoder then executes the algorithm in accordance with the present invention to select the optimum deadzone quantizer to be used for a given bit-rate, e.g., the Internet bandwidth currently available or disk space. In one embodiment, the computer/encoder first loads a look-up table that is computed as a function of $h(P_0)=-P_0 \log P_0-(1-P_0)\log(1-P_0)$ where $$P_0 = \int_{-\delta}^{\delta} P(x)dx,$$

into a random access memory (RAM).

The computer/encoder then determines the allowable zero bin width(s). For each of the allowable zero bin width, the computer/encoder determines the optimal outer bin width out of N numbers of candidates and selects the outer bin width which produces a result that satisfies the bit rate requirement and has the minimum distortion. In one embodiment, a fast algorithm is used to search the outer bin width that satisfies the above conditions. The outer bin width that produces a result that satisfies the conditions is recorded. However, if none of the N numbers of candidates satisfies the requirements for a particular zero bin width, the zero bin width is discarded and nothing is recorded. The computer/encoder then selects the best bin width combination out of all recorded combinations, i.e., the combination having the least distortion. The computer/encoder then quantizes the image using this optimal deadzone quantizer and codes the image using a conventional compression method such as, but not limited to, entropy coding.

Although the invention has been described with reference to particular embodiments, the description is illustrative and not limiting. Various other adaptations and combinations of features of the embodiments disclosed are within the scope of the invention as defined by the following claims.

I claim:

1. A method of optimizing a deadzone quantizer, comprising:

providing a transformed image with symmetric uni-modal distribution;

quantizing said image using a deadzone quantizer;

dividing said quantizer into a zero bin having a zero bin width and a plurality of outer bins having an outer bin width;

providing M numbers of candidate values for said zero bin width and N numbers of candidate values for said outer bin width;

deriving a zero bin probability from an entropy function for said bins, said entropy function having a maximum value;

calculating an allowable zero bin width from said zero bin probability and a target bit rate; and searching said allowable zero bin width for an optimum combination of zero bin width and outer bin width.

2. The method of claim 1, wherein said image is a still image.

3. The method of claim 1, wherein said image is a video image.

4. The method of claim 1, wherein said deriving a zero bin probability comprise:

equating said entropy function to a target entropy value; and solving said entropy function to derive said zero bin probability.

5. The method of claim 1, wherein said deriving a zero bin probability from an entropy function comprises:

generating a zero bin probability look up table, comprising:

equating said entropy function to a target entropy value;

solving said entropy function to derive said zero bin probability; and storing said target entropy value and said zero bin probability in a memory;

loading said zero bin probability look up table from said memory into a random access memory; and searching said zero bin probability look up table for a given target entropy value.

6. The method of claim 1 wherein said searching said allowable zero bin width comprises:

calculating a distortion measure for each combination of said allowable zero bin width and said N number of candidate values for said outer bin width; and selecting the combination resulting in the least distortion measure.

7. The method of claim 1, wherein said searching said allowable zero bin width comprises:

calculating a distortion measure for each combination of said allowable zero bin width and a reduced number of said N number of candidate values for said outer bin width; and selecting the combination having the least distortion measure.

8. The method of claim 7, wherein said reduced number is logN.

9. The method of claim 1, wherein said searching comprises a fast searching algorithm.

10. The method of claim 1, wherein said searching comprises bi-section searching algorithm.

11. The method of claim 1, wherein said allowable bin width is a subset of said M number of candidate values for said zero bin width.

12. The method of claim 1, further comprising deriving a plurality of zero bin probabilities from said entropy function and searching MN combinations of said zero bin width and said outer bin width for said optimum combination when a target entropy is greater than said maximum value.

13. The method of claim 1, further comprising deriving two zero bin probabilities from said entropy function and searching a subset of MN combinations of said zero bin width and said outer bin width for said optimum combination at a high bit-rate.

14. The method of claim 1, further comprising deriving one zero bin probability from said entropy function and searching a subset of MN combinations of said zero bin width and said outer bin width for said optimum combination at a low bit-rate.

15. The method of claim 1, further comprising calculating a quantization value.

16. The method of claim 15, wherein said calculating a quantization value comprises finding a middle number between an upper boundary number and a lower boundary number of an interval.

17. The method of claim 15, wherein said calculating a quantization value comprises finding a centroid between an upper boundary number and a lower boundary number of an interval.

* * * * *